United States Patent
Bradford et al.

(10) Patent No.: US 7,046,928 B1
(45) Date of Patent: May 16, 2006

(54) LINK DISCOVERY AND VERIFICATION USING LOSS OF LIGHT

(75) Inventors: Richard Bradford, Westford, MA (US); Daniel C. Tappan, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 458 days.

(21) Appl. No.: 09/968,096

(22) Filed: Sep. 28, 2001

(51) Int. Cl.
- H04B 10/08 (2006.01)
- H04B 17/00 (2006.01)
- H04B 10/00 (2006.01)
- H04J 14/00 (2006.01)
- G02F 1/00 (2006.01)

(52) U.S. Cl. ............... 398/9; 398/16; 398/19; 398/5; 398/25

(58) Field of Classification Search ............ 398/2, 398/10, 12, 19, 30, 33, 45, 50, 109, 110, 111, 398/9, 7, 49, 48, 51, 56, 57, 79, 16, 5, 25, 398/32, 82; 370/248, 241
See application file for complete search history.

(56) References Cited

U.S. PATENT DOCUMENTS

| | | | |
|---|---|---|---|
| 6,600,581 B1 * | 7/2003 | Fatehi et al. ............ | 398/9 |
| 6,681,248 B1 * | 1/2004 | Sears et al. ............ | 709/223 |
| 6,804,463 B1 * | 10/2004 | Arecco et al. ............ | 398/19 |
| 6,871,021 B1 * | 3/2005 | Graves et al. ............ | 398/45 |
| 2002/0126342 A1 * | 9/2002 | Wetzel et al. ............ | 359/117 |
| 2002/0191247 A1 * | 12/2002 | Lu et al. ............ | 359/124 |
| 2003/0020976 A1 * | 1/2003 | Krishnaswamy et al. ... | 359/110 |

OTHER PUBLICATIONS

Lang, et al., Link Management Protocol (LMP), Internet Draft, Internet Engineering Task Force, Jul. 2001.

* cited by examiner

Primary Examiner—M. R. Sedighian
Assistant Examiner—Quan-Zhen Wang
(74) Attorney, Agent, or Firm—Aka Chan LLP (57) ABSTRACT

Systems and methods for link discovery and verification that minimize the need for line termination resources to generate and interpret packets. To verify a link between two nodes, a first of the nodes toggles light or another signal output by one of its ports while the other node attempts to detect the toggling through its own ports. A link is therefore verified between the port that is toggling and the port that detects the toggling. This link verification technique does not require packet termination capability at either node. Furthermore, this link verification technique is very simple and may be executed very quickly even at nodes having a very large number of ports to which links maybe established.

40 Claims, 5 Drawing Sheets

LINK DISCOVERY AND VERIFICATION USING LOSS OF LIGHT

BACKGROUND OF THE INVENTION

The present invention relates to data communication networks, and more particularly to systems and methods for discovering and verifying links between nodes.

Internet traffic is typically forwarded from a source to a destination through a series of nodes connected by links. The nodes represent network devices such as routers, switches, etc. The links are physical media such as optical fiber, twisted pair, etc. and often connect a pair of nodes. Various protocols that control the forwarding of packets through a network depend on each node having a correct understanding of the links available to its immediate neighbors.

Typically, discovery and/or verification of a link between two nodes is accomplished by an exchange of packets over the link. As will now be explained, however, this exchange of packets is problematic for an important new class of network devices.

To accommodate increasing volumes of network traffic, the Internet is relying more and more on the vast bandwidth of optical fiber media. Routing and switching operations, however, have largely remained in the electrical domain. The need to convert optical signals to electrical fort and then perform switching and/or routing computations on the electrical signals has become a bottleneck for optical networks. In order to remove this bottleneck, all-optical cross-connects (OXCs) have emerged as an important building block for optical networks. In an OXC, optical inputs and outputs are coupled to one another through a switching matrix without intermediate conversion to an electrical signal. Since the optical signals pass through untouched, OXCs do not incorporate expensive hardware either for conversion to electrical form and reconversion to optical form, or for processing packets in accordance with a protocol. This results in enormous savings in cost and extremely high throughput. Another advantage of the OXC is that it requires no special adaptation to the protocol or data rate of the data carried by the switched optical signals.

To best integrate OXCs into the Internet, it is desirable to discover and verify links to and from them. However, if an OXC is to exchange packets with its neighbors for the purpose of link discovery and verification according to conventional techniques, it will have to incorporate line termination capability, i.e., the ability to generate and interpret packets in accordance with a protocol used by a neighbor. Supporting this capability will require that a line termination unit (LTU) capable of generating and interpreting packets according to the relevant protocol be incorporated within the OXC. To maximize the number of protocols which use an OXC, it will be desirable to incorporate a separate line termination unit (LTU) for each anticipated protocol that might be terminated by a neighboring node. Each LTU would incorporate the electrical to optical and the optical to electrical conversion circuitry as well as high speed packet processing that would otherwise be made unnecessary by use of the OXC.

Furthermore, when a particular OXC switch port is having its neighbor connectivity verified, that port must be switched to another port connected to the correct LTU so that the appropriate packets may be exchanged. Thus, each LTU that is needed consumes a port and also a significant percentage of the available switching resources. It becomes clear then that current link discovery and verification techniques are expensive to apply to optical switching equipment that is not otherwise capable of originating and/or interpreting packets via optical links.

Another type of device that is finding increasing application on the Internet is the dense wave division multiplexer (DWDM) that multiplexes signals from several incoming fibers onto multiple wavelengths on the same fiber and demultiplexes multiple wavelength components carried by the same fiber onto separate filers. By allowing the combining of numerous signals on the same fiber, DWDMs greatly expand the transmission capacity without increasing the data rate of individual optical signals, thus simplifying the electronics needed to generate and interpret the payload data streams modulated onto the optical signals. DWDMs are also preferably insensitive to protocol and data rate.

DWDMs, depending on the application, may or may not incorporate hardware to convert optical signals to electrical signals and vice versa. However, DWDM equipment does not typically include the capability to terminate packets that are being carried by optical signals. As with OXCs, this represents an obstacle to current link discovery and verification techniques.

What is needed are systems and methods for link discovery and verification that minimize the needed line termination resources and are thus suitable for implementation on devices that do not otherwise provide extensive line termination capabilities such as OXCs and DWDMs.

SUMMARY OF THE INVENTION

One embodiment of the present invention provides systems and methods for link discovery and verification that minimize the need for line termination resources to generate and interpret packets. To verify a link between two nodes, the first of the nodes toggles light or another signal output by one of its ports while the other node attempts to detect the toggling through its own ports. The term "toggling" as used here refers to activation and deactivation of light or another signal including repeated activation and deactivation in accordance with a pattern. A link is therefore verified between the port that is toggling and the port that detects the toggling. This link verification technique does not require packet termination capability at either node. Furthermore, this link verification technique is very simple and may be executed very quickly even at nodes having a very large number of ports to which links may be established.

A first aspect of the present invention provides a method for operating a first node in a data communication network to verify connectivity to a second node in the data communication network. The method includes: toggling a signal emitted by a port of the first node and notifying the second node of a toggling mode of the port to facilitate connectivity verification.

A second aspect of the present invention provides a method for operating a first node in a data communication network to verify connectivity to a second node in the data communication network. The method includes: detecting toggling of a signal received at a port of the first node and verifying a link to the second node by matching the toggling to a known toggling mode of a port of the second node.

Further understanding of the nature and advantages of the inventions herein may be realized by reference to the remaining portions of the specification and the attached drawings.

DESCRIPTION OF SPECIFIC EMBODIMENTS

The present invention finds application in networks where it is desirable for nodes to discover and verify links among themselves. Wherever the terms "verify" or "verification" are used, it will be understood that the present invention also applies to the discovery of links. One particular application of the present invention is to optical network devices such as optical cross-connects (OXCs) and dense wave division multiplexers (DWDMs) that require link verification yet are often unable to terminate packets.

Figure 1:
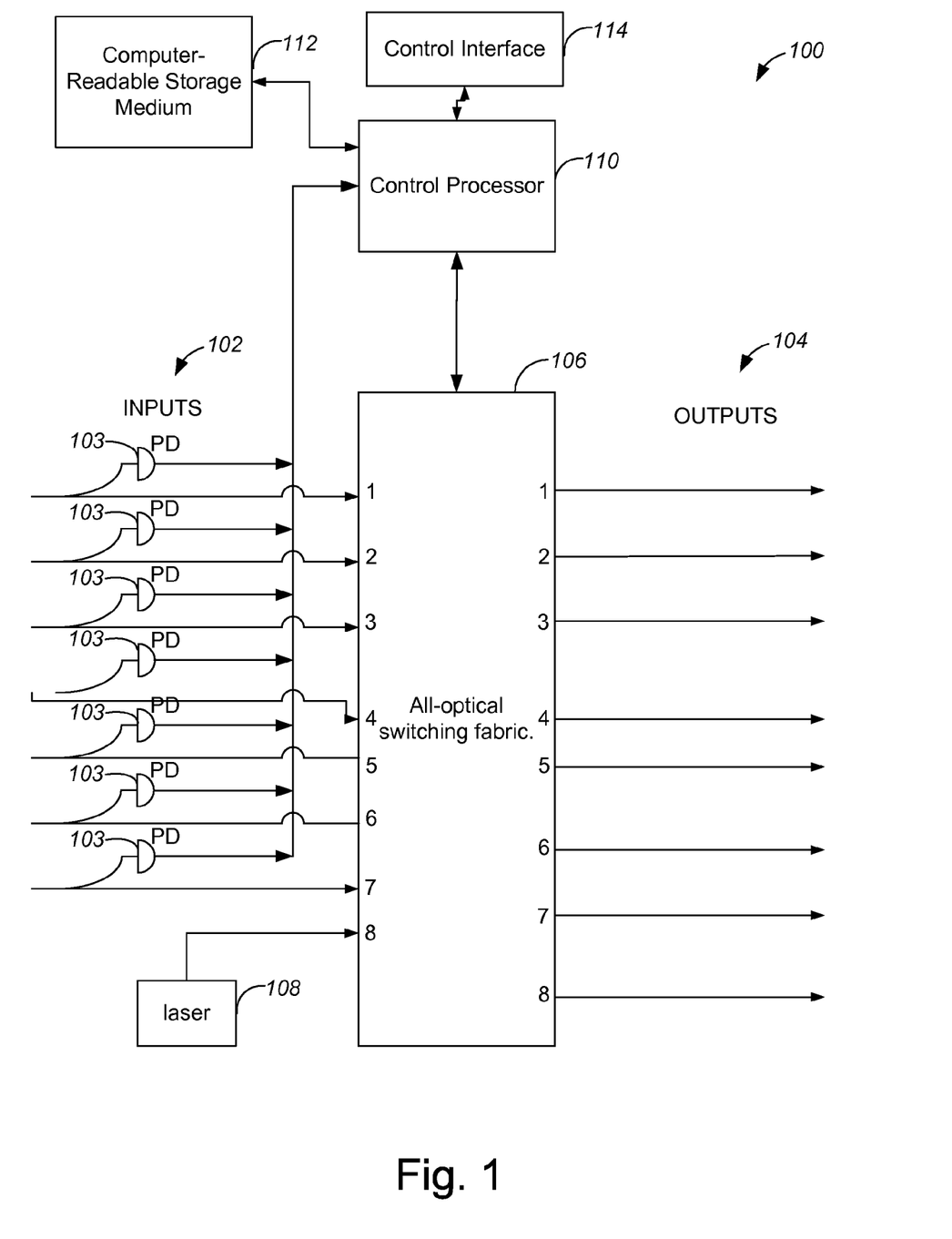
FIG. 1 depicts an optical cross-connect (OXC) suitable for implementing one embodiment of the present invention.

Before describing details of link verification operation according to the present invention, the structures of representative nodes that may participate in link verification schemes will be described. FIG. 1 depicts an all-optical cross-connect (OXC) 100 suitable for implementing one embodiment of the present invention. An OXC 100 provides connectivity between a plurality of inputs 102 and a plurality of outputs 104. These are understood to be optical inputs and optical outputs. A photodetector 103 is coupled to each of inputs 102. Any one of inputs 102 may be selectively coupled to any one of outputs 104 through an all-optical switching fabric 106. Switching fabric 106 has eight ports each including one input and one output. The input to a port 8 is connected to a laser 108.

Switching fabric 106 is implemented by e.g., a MEMS integrated circuit that uses adjustable mirrors to guide light from a desired input to the desired output. A representative switching fabric is the PDS-002 model available from OMM, Inc. of San Diego, Calif. Any suitable technology maybe used to implement switching fabric 106. A control processor 110 selects a mapping of inputs to outputs. Control processor 110 may be implemented in any suitable manner such as e.g., a general programmable processor, custom logic, multiprocessor system, or any combination thereof. Processor 110 may execute software instructions in any suitable machine level or high level programming language. Storage medium 112 may store instructions for control processor 110. Storage medium 112 may represent a memory device such as a random access memory device, magnetic storage medium, an optical storage medium, etc. Instructions on storage medium 112 may be loaded from another storage medium such as e.g., a compact disc (CD), a digital video disc (DVD), a floppy disc, etc. Another example of loading instructions from another storage medium is receiving code via a network.

Control packets used in implementing one embodiment of the present invention maybe transmitted and received via a control interface 114. Control interface 114 may be e.g., an Ethernet interface, a SONET Interface, etc. Control interface 114 may also receive control packets to direct the mapping between inputs 102 and outputs 104.

Figure 2A:
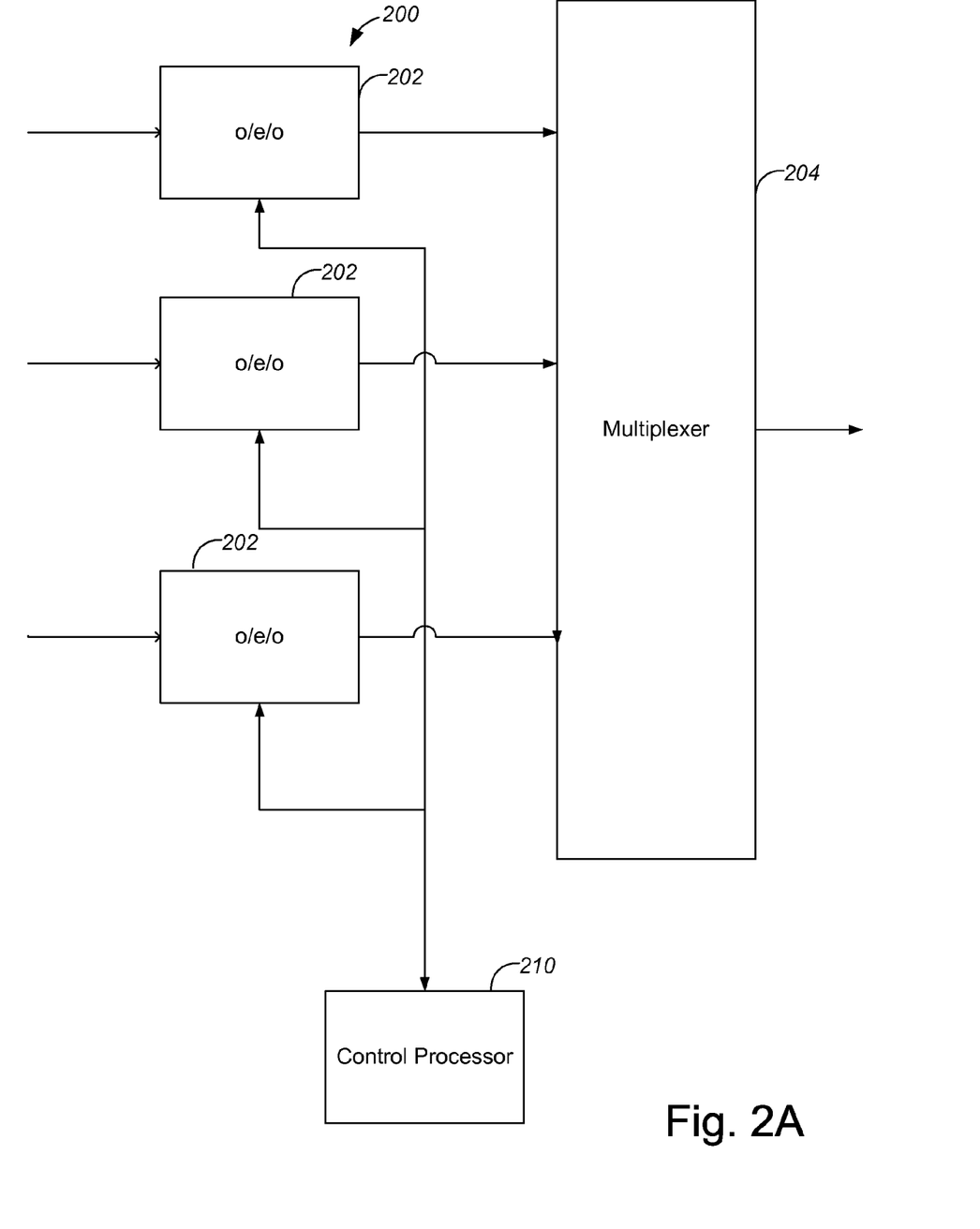
FIGS. 2A–2B depict a dense wave division multiplexer (DWDM) suitable for implementing one embodiment of the present invention.
Figure 2B:
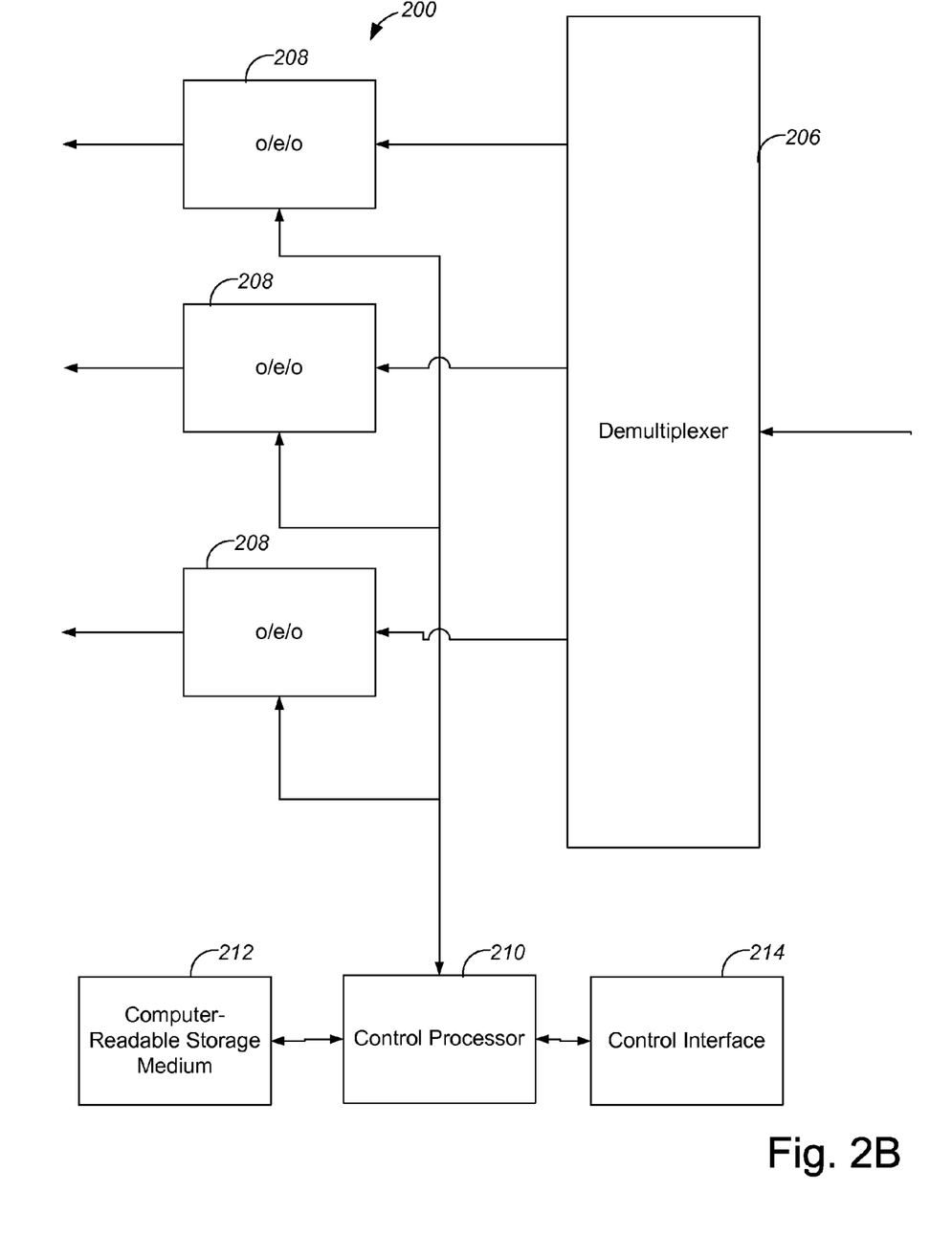

Referring now to FIGS. 2A–2B, a dense wave division multiplexer (DWDM) 200 suitable for implementing the present invention is depicted. FIG. 2A depicts a portion of DWDM 200 where multiple optical signals are combined onto the same fiber. FIG. 2B depicts a portion of DWDM 200 that operates in the reverse direction, extracting multiple wavelength components from a single fiber and separating them onto multiple fibers each carrying a single wavelength. For ease of illustration, FIG. 2A–2B assume a system that combines 3 wavelengths on a single fiber but it will of course be appreciated that DWDM techniques apply to any number of wavelengths.

In FIG. 2A, each incoming optical signal is input to an optical-to-electrical conversion (o/e/o) block 202. Each o/e/o block 202 incorporates a photodetector convert the optical signal to electrical form and a laser to regenerate the optical signal. The o/e/o block 202 may also position its output in the frequency domain in accordance with an operative wavelength division multiplexing scheme. To support link verification in accordance with the present invention, o/e/o block 202 is capable of sensing the presence or absence of light on its input. The various outputs of o/e/o blocks 202 are combined onto the same fiber by a multiplexer 204.

In FIG. 2B, a demultiplexer 206 receives a wavelength division multiplexed signal including multiple wavelength components and outputs the components on separate fibers. A set of o/e/o blocks 208 convert the demultiplexed optical signals to electrical form and then regenerate them optically onto wavelengths appropriate for reception by other hardware. The o/e/o blocks 208 incorporate photodetectors to convert from optical to electrical and lasers to regenerate the optical signals.

A control processor 210 interacts with o/e/o blocks 202 and o/c/o blocks 208 to monitor and control activity. According to one embodiment of the present invention, control processor 210 may direct any of o/e/o blocks 208 to turn light output on or of to support link verification. Furthermore, control processor 210 is capable of monitoring whether light energy is present at the inputs of o/e/o blocks 202. Control processor 210 may be implemented, e.g., in any of the ways discussed in reference to control processor 110. Also, as with control processor 110, instructions for control processor 210 may be stored on a computer-readable storage medium 212 or loaded from another storage medium. Control interface 214 may, similarly to control interface 114, exchange control packets to support link verification, or also receive instructions concerning the overall operation of DWDM 200.

Figure 4:
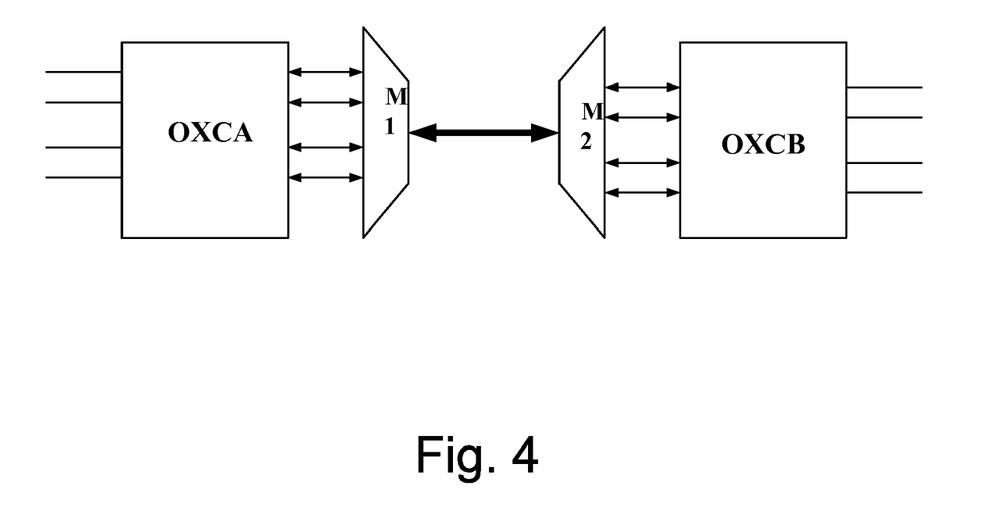
FIG. 4 depicts a link verification situation where loss of light techniques may be used according to one embodiment of the present invention.

Now that the structures of representative participating nodes have been described, link verification according to one embodiment of the present invention will be described with reference to an example situation depicted in FIG. 4. In FIG. 4, OXCA is to verify links with OXCB. OXCA and OXCB are depicted as exchanging four optical signals that are wavelength multiplexed onto the same fiber by the operation of DWDM's M1 and M2. Thus, four ports (input and output) of OXCA are coupled to four ports of M1 (input and output) while four ports of OXCB (input and output) are coupled to four ports of M2 (input and output).

Figure 3:
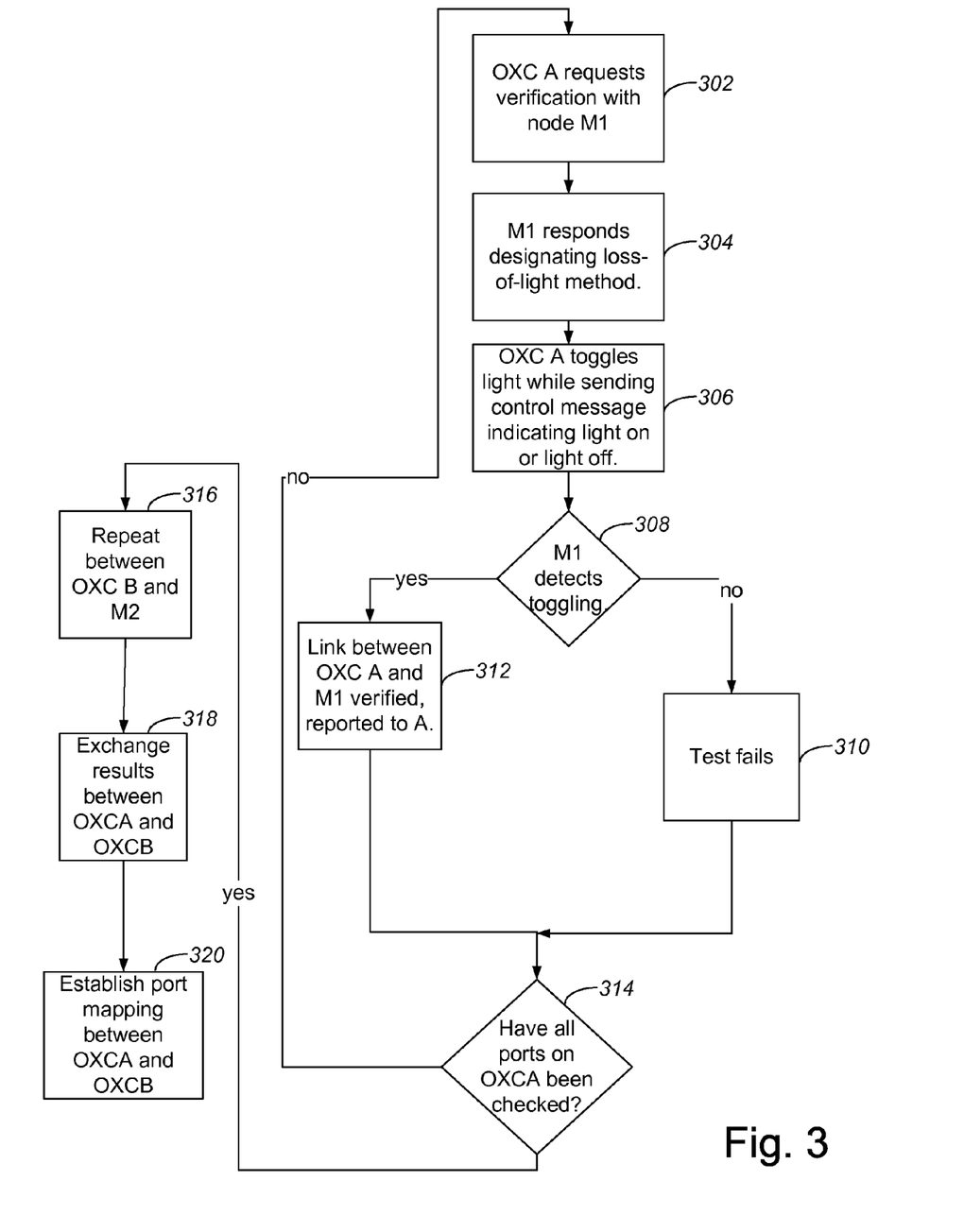
FIG. 3 is a flowchart describing steps of link verification using loss of light according to one embodiment of the present invention.

FIG. 3 is a flowchart describing steps of link verification between OXCA and OXCB according to one embodiment of the present invention. Details of link verification operation will be described in terms of an extension of the Link Management Protocol (LMP) which is described in Lang, et al. Link Management Protocol (LMP) Internet Draft, Internet Engineering Task Force, July 2001, the contents of which are herein incorporated in their entirety by reference for all purposes. The present invention may also be implemented without employing LMP.

Since OXCA is not directly coupled to OXCB but rather coupled to OXCB through M1 and M2, link verification between OXCA and OXCB is accomplished by first verifying between OXCA and M1 and between OXCB and M2 and then establishing a mapping based on the wavelength assignments in place between M1 and M2. At step 302, OXCA requests verification with M1. This request is sent through the control channel rather than through any of the optical connections between OXCA and M1 and identifies the IP addresses of OXCA and M1 as well as which port OXCA will be verifying connectivity through. M1 responds at step 304 by sending an LMP message, VerifyTransportMechanism, through the control channel, that is extended according to the present invention to designate loss-of-light as the verification mechanism. Instead of sending test packets via the port being verified as would be done in accordance with LMP, OXCA, at step 306, toggles the light output by the port under test. Simultaneously, OXCA sends OXCB control messages via the control channel indicating whether the light is currently on or off. The frequency of toggling should preferably be sufficiently low for the control messages for the synchronized control messages to be communicated and processed.

In order to perform the toggling function, switching fabric 106 may be used to alternately connect and disconnect the output of the port under test to port 8 which is hardwired to laser 108. Alternatively, laser 108 may be switched on and off to achieve the desired toggling.

At step 308, M1 monitors its input ports to look for the toggling effect caused by OXCA. M1 will monitor the light on or light off condition of each port to identify a particular port that it is indeed synchronized with the control messages generated by OXCA. Alternatively, it is also possible to communicate an aperiodic toggling pattern or a pseudorandomly generated toggling pattern to M1 instead of communicating control messages synchronized with the toggling. M1 would then seek to match any detected toggling to the pattern. If no toggling has been detected on any of M1's ports, processing proceeds to a step 310 and the test fails. M1 sends an LMP TestStatusFailure message indicating the failure to OXCA via the control channel.

If, however, M1 has detected toggling through a particular one of its ports at step 308, then a link between OXCA and M1 has been verified. Then, at step 312, M1 sends OXCA, via the control channel, an LMP TestStatusSuccess message identifying the ports that have been verified as linked. The TestStatusSuccess message may also identify the wavelength to which M1 assigns the verified port.

After either step 312 or step 310, link verification proceeds to a step 314 which tests whether OXCA has verified connectivity to M1 through all of its available ports already. If OXCA has not, then processing returns to step 302 for verification of the mapping of the next available port. If however, all of the available ports on OXCA have been mapped to M1, execution proceeds to a step 316. Although step 316 is depicted as following the previously discussed steps, it will be appreciated that it may also occur in parallel.

At step 316, OXCB verifies its connectivity to M2, establishing a similar mapping of its ports to the ports of M2 using the same procedure that has been described with reference to OXCA and M1.

At the completion of step 316, OXCA is aware of the mapping of its ports to the ports of M1, while OXCB is aware of the mapping of its ports to M2. This also includes all awareness of the particular wavelengths associated with each relevant port of M1 such that each port of OXCA has thereby been mapped to a wavelength on the line connecting M1 and M2. Similarly, each port on OXCB has also now been associated with a wavelength on the line coupling M1 and M2. It is therefore now possible by analyzing this wavelength mapping, to establish the port mapping between OXCA and OXCB.

In one embodiment, LMP LinkSummary messages are used to establish the port mapping. For example, at step 318, OXCA sends OXCB a series of LinkSummary messages via the control channel indicating the mapping between the ports of OXCA and the various wavelengths. Similarly, also at step 318, OXCB sends OXCA its own mapping between the ports of OXCB and the various associated wavelengths. Based on this exchange of information, either OXCA or OXCB determines the mapping between ports of OXCA and ports of OXCB and communicates this mapping to the other OXC at step 320, using a LinkSummary message.

It should be noted that although the above process has been described with reference to OXCs performing toggling and DWDMs detecting this toggling, the present invention also contemplates that toggling may be detected by the OXCs through, e.g., one of photodetectors 103 coupled to inputs 102 in FIG. 1. Also, the present invention is not restricted to optical devices and toggling light but will find application, e.g., wherever a signal may be turned on or off.

An advantageous modification to the link verification technique described above is for a single node to simultaneously toggle light through multiple ports. This greatly increases the speed of link verification. Toggling will then preferably be coordinated so that the monitoring node can distinguish among the multiple toggled light signals. For example, instead of sending control messages indicating the "light on" or "light off" state of each port, a single control message may include a bitmap that gives the current "light on" or "light off" state of each toggling port. By performing verification through multiple ports in parallel and aggregating current light state information into a single control message, one can greatly reduce the message exchanges needed to map ports.

Consider a situation where the toggling node has 8 ports. The sender first disables light on ports 0–3, enable light on ports 4–7 and send the value 0xF0 (hex) via the control channel as a bitmap where "0" indicates the absence of light and "1" the presence of light. Once the light status had been recorded on the monitoring node, the toggling node changes to the next pattern, for example, disabling light on ports 0,1,4, and 5 and enabling light on ports 2,3,6 and 7 resulting in a bitmap of 0xCC (hex). Each change in pattern is signaled by a control message including the currently operative bitmap. By activating and deactivating light at the various ports in accordance with the bitmaps in the series, 0xF0, 0xCC, 0xAA, and 0x55, the monitoring node maps all eight ports with a sequence of only 4 patterns. Using this technique, 16 ports can be distinguished using a sequence of only 5 patterns, 32 ports using 6 patterns, etc.

With the above-described modification, the time necessary to verify links from a node having p ports will vary roughly with $\ln(p)$. By contrast, with the technique specified by LMP, link verification time varies roughly with $p^2$. The present invention thus provides enormous advantages in applications where nodes have a large number of ports, e.g., 512 ports.

In one embodiment, where line termination capability is available, loss of light is used as an extension to LMP verification techniques that rely on exchanging data packets via the tested ports rather than through a control channel as described above. Considering the procedure described above for link verification between OXCA and M1, one could use the loss of light technique that has been described to eliminate the ports on M1 that do not detect toggling and then use the verification techniques provided by LMP to further verify the link to the port that does detect toggling. This can greatly increase the speed of verification, especially where there are large numbers of ports to be tested.

The present invention thus provides rapid link verification without the need to terminate packets in accordance with any particular protocol. Alternatively, existing link verification techniques may be accelerated.

It is understood that the examples and embodiments that are described herein are for illustrative purposes only and various modifications are changes in light there of will be suggested to persons skilled in the art and are to be included within the spirit and purview of this application and scope of the appended claims and their full scope of equivalents. For example, although optical cross-connects and DWDMs have been described as representative nodes that may implement the link verification techniques described herein, the present invention may be applied to any suitable network device including, e.g., IP switches, ATM switches, SONET TDM add/drop multiplexers, optical packets switches, optical packet routers, etc. Also, the term "port" may refer to a logical port as well as a physical port.

What is claimed is:

1. A method for operating a first node in a data communication network to verify connectivity to a second node in said data communication network, said method comprising:
   sending a request for verification of connectivity to said second node, said request for verification of connectivity identifying an IP address of said first node and an IP address of said second node, said request for verification of connectivity further identifying a port of said first node;
   toggling a signal emitted by said port of said first node;
   notifying said second node of a toggling mode of said port to facilitate connectivity verification; and
   receiving a first message from said second node indicating whether said second node detected said toggling, said request for verification of connectivity identifying said first node being sent on a control channel via a control message separate from said signal and said first message being sent on said control channel, wherein if said first message indicates that said second node detected said toggling, said first message identifies a wavelength which the second node assigns the port.

2. The method of claim 1 further comprising:
   simultaneous with toggling of said signal emitted by said port of said first node, toggling another signal emitted by another port of said first node.

3. The method of claim 1 further comprising:
   sending notifications from said first node to said second node as said signal toggles on and off to facilitate connectivity verification.

4. The method of claim 1 wherein said signal comprises an optical signal.

5. The method of claim 1 wherein said signal comprises a selected wavelength component of a WDM signal.

6. The method of claim 1 wherein toggling comprises: turning said signal on and off aperiodically.

7. The method of claim 1 wherein toggling comprises: turning said signal on and off in accordance with a pseudorandomly selected sequence of intervals.

8. The method of claim 1 wherein sending a request for verification from said first node to said second node comprises sending an IP address of the first node and identifying a port for verifying connectivity therethrough.

9. The method of claim 1 further comprising notifying said second node of a toggling pattern.

10. The method of claim 1 wherein receiving a message from said second node indicating whether said second node detected said toggling comprises receiving a link management protocol message.

11. A method for operating, a first node in a data communication network to verify connectivity to a second node in said data communication network, said method comprising:
    receiving a request for verification of connectivity from said second node on a control channel, said request for verification of connectivity identifying an IP address of said second node and an IP address of said first node, said request for verification of connectivity further identifying a port at said second node;
    detecting toggling of a signal received at a port or said first node;
    verifying a link to said second node by matching said toggling to a known toggling mode of said port at said second node; and
    sending a message to said second node indicating whether said first node matched said toggling to said known toggling mode, said message being sent on said control channel, wherein if said message indicates that said first node matched said toggling to said known toggling mode, said message identifies a wavelength which said first node assigns said port at said second node.

12. The method of claim 11, further comprising:
    simultaneously with detecting toggling of said signal received at said port of said first node, detecting; toggling of another signal received at another port of said first node; and
    verifying an additional link to said second node by matching said toggling of another signal to a known toggling mode of an additional port at said second node.

13. The method of claim 11 wherein verifying comprises:
    receiving messages from said second node indicating when a toggled signal transmitted by said second node has been turned on and turned off; and
    matching said messages to on and off states of said signal received at said port of said first node.

14. The method of claim 13 wherein receiving messages comprises:
    receiving messages through a control channel.

15. The method of claim 11 wherein said signal comprises an optical signal.

16. Apparatus for operating a first node in a data communication network to verify connectivity to a second node in said data communication network, said apparatus comprising:
    a processor that sends a request for verification of connectivity to said second node, said processor being arranged to toggle a signal emitted by a port of said first node, said request for verification of connectivity being arranged to identify an IP address of said first node, an IP address of said second node, and said port; and
    a control interface that notifies said second node of a toggling mode of said port to facilitate connectivity verification, said connectivity verification designating a loss-of-light verification mechanism, wherein said request for verification is sent on a control channel via a control message separate from said signal.

17. The apparatus of claim 16 wherein said control interface sends notifications form said first node to said second node as said signal toggles on and off to facilitate connectivity verification.

18. The apparatus of claim 16, wherein said signal comprises an optical signal.

19. The apparatus of claim 16, wherein said signal comprises a selected wavelength component of a WDM signal.

20. The apparatus of claim 16 wherein said processor toggles by turning said signal on and off aperiodically.

21. The apparatus of claim 16 wherein said processor toggles by turning said signal on and off in accordance with a pseudorandomly selected sequence of intervals.

22. Apparatus for operating a first node in a data communication network to verify connectivity to a second node in said data communication network, said apparatus comprising:
   a photodetector that detects toggling of a signal received at a port of said first node; and
   a processor that receives a request for verification of connectivity at said second node and verifies a link to said second node by matching said toggling to a known toggling mode of a port at said second node, wherein said request for verification comprises identification of an IP address of said first node, an IP address of said second node, and a port over which connectivity verification is to be performed and wherein said identification of said IP address of said first node, said IP address of said second node, and said port is received on a control channel via a control message separate from said signal, said connectivity verification designating a loss-of-light as a verification mechanism.

23. The apparatus of claim 22 wherein said processor receives messages from said second node indicating when a toggled signal transmitted by said second node has been turned on and turned off and matches said messages to on and off states of said signal received at said port of said first node.

24. The apparatus of claim 23 wherein said messages are received through a control channel.

25. The apparatus of claim 22 wherein said signal comprises an optical signal.

26. Apparatus for operating a first node in a data communication network to verity connectivity to a second node in said data communication network, said apparatus comprising:
   means for sending a request or verification of connectivity to said second node, said request for verification of connectivity identifying an IP address of said first node and an IP address of said second node, said request for verification of connectivity further identifying a port of said first node;
   means for toggling a signal emitted by said port of said first node;
   means for notifying said second node of a toggling mode of said port to facilitate connectivity verification; and
   means for receiving a first message from said second node indicating whether said second node detected said toggling, said request for verification of connectivity identifying said first node being sent on a control channel via a control message separate from said signal and said first message being sent on said control channel, wherein if said first message indicates that said second node detected said toggling, said first message identifies a wavelength which the second node assigns the port.

27. The apparatus of claim 26 further comprising:
   means for sending notifications from said first node to said second node as said signal toggles on and off to facilitate connectivity verification.

28. The apparatus of claim 26 wherein said toggling means comprises:
   means for turning said signal on and off aperiodically.

29. The apparatus of claim 26 wherein said toggling means comprises:
   means turning said signal an and off in accordance with a pseudorandomly selected sequence of intervals.

30. The apparatus of claim 26 wherein one of the said first and second nodes is an optical cross-connect and the other of said first and second nodes is a dense wave division multiplexer.

31. Apparatus for operating a first node in a data communication network to verify connectivity to a second node in said data communication network, said apparatus comprising:
   means for receiving a request for verification of connectivity from said second node on a control channel, said request for verification of connectivity identifying an IP address of said second node and an IP address of said first node, said request for verification of connectivity further identifying a port at said second node;
   means for detecting toggling of an optical signal received at a part of said first node; and
   means for verifying a link to said second node by matching said toggling to a known toggling mode of said port at said second node, wherein said request for verification comprises identification of an IP address of said first node, an IP address of said second node, and a port over which connectivity verification is to be performed and wherein said identification of said IP address of said first node, said IP address of said second node, and port information is received on a control channel via a control message separate from said signal.

32. The apparatus of claim 31 wherein said verifying means comprises:
   means for receiving messages from said second node indicating when a toggled optical signal transmitted by said second node has been turned on and turned off; and
   means matching said messages to on and off states of said optical signal received at said port of said first node.

33. The apparatus of claim 32 wherein said means for receiving messages comprises;
   means for receiving messages through a control channel.

34. A computer program product for operating a first node in a data communication network to verify connectivity to a second node in said data communication network, said computer program product comprising:
   code that receives a request for verification of connectivity from said second node, said request for verification of connectivity identifying an IP address of said first node and an IP address of said second node, said request for verification of connectivity further identifying a port of said second node;
   code that detects toggling of an optical signal received at a port of said first node;
   code that verifies a link to said second node by matching said toggling to a known toggling mode of a port at said second node, wherein said request for verification of connectivity identifying said IP address of said first node, said IP address or said second node, and said port of said second node is sent on a control channel via a control message separate from said signal; and a computer-readable storage medium that stores the codes.

35. The computer program product of claim 34 wherein said code that verifies comprises:

code that receives messages from said second node indicating when a toggled optical signal transmitted by said second node has been turned on and turned off; and code that matches said messages to on and off states of said optical signal received at said port of said first node.

36. The computer program product of claim 35 wherein said code that receives messages comprises:

code that receives messages through a control channel.

37. A computer program product for operating a first node in a data communication network to verify connectivity to a second node in said data communication network, said computer program product comprising:

code that is configured for sending a request for verification of connectivity to said second node on a control channel, said request for verification of connectivity identifying an IP address of said second node and an IP address of said first node, said request for verification of connectivity further identifying a port at said second node;

code that toggles an optical signal emitted by a port of said first node;

code that notifies said second node of a toggling mode of said port to facilitate connectivity verification, wherein said request for verification comprises identification of said IP address of said first node, said IP address of said second node, and said port at said second node over which connectivity verification is to be performed and wherein said identification of said IP address of said first node, said IP address of said second node, and said port at said second node is received on a control channel via a control message separate from said signal; and a computer-readable storage medium fur storing the codes.

38. The computer program product of claim 37 further comprising:

code that sends notifications from said first node to said second node as said optical signal toggles on and off to facilitate connectivity verification.

39. The computer program product of claim 37 wherein said code that toggles comprises:

code that turns said optical signal on and off aperiodically.

40. The computer program product of claim 37 wherein said code that toggles comprises:

code that turns said optical signal on and off in accordance with a pseudorandomly selected sequence of intervals.

* * * * *